No. 837,473. PATENTED DEC. 4, 1906.
L. G. IHRIG.
IMPLEMENT FOR DEADENING TOBACCO PLANTS.
APPLICATION FILED APR. 19, 1906.
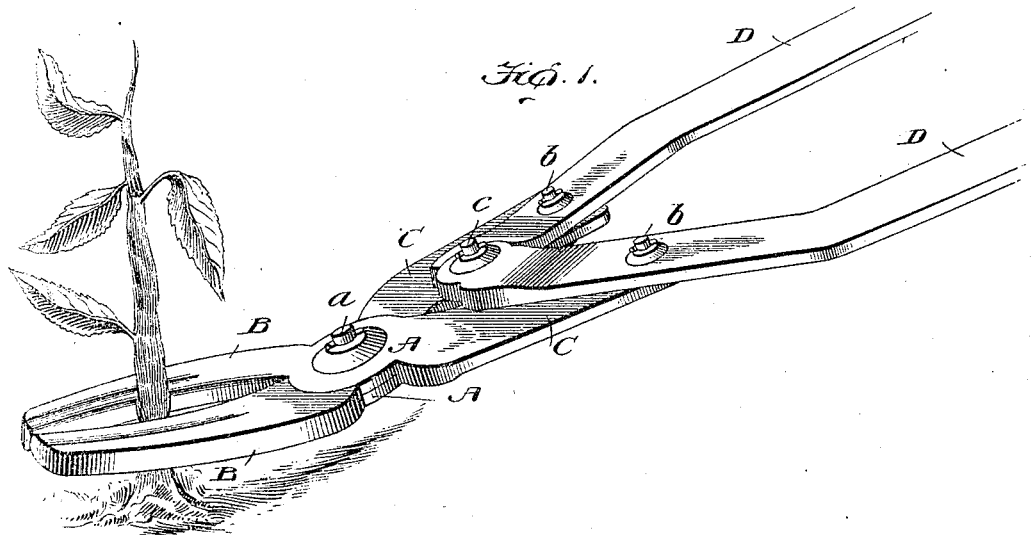
Fig. 1.
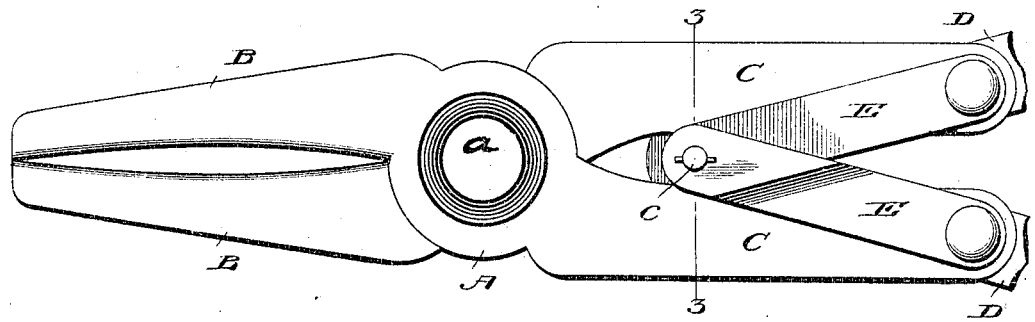
Fig. 2.
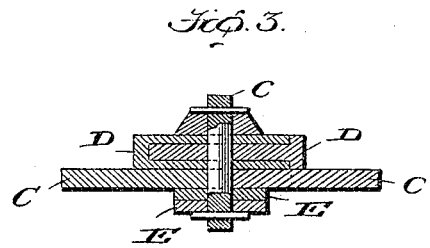
Fig. 3.
Witnesses: 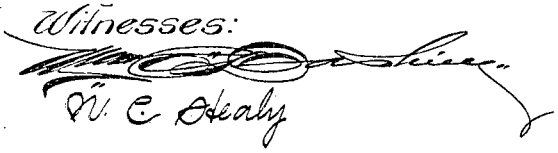
Inventor
L. G. Ihrig.
By James Sheehy
Atty.
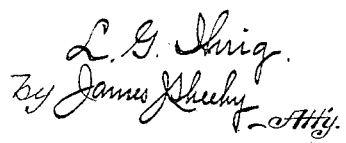
THE NORRIS PETERS CO., WASHINGTON, D. C.

UNITED STATES PATENT OFFICE.

LUTHER GEO. IHRIG, OF LENOXBURG, KENTUCKY.

IMPLEMENT FOR DEADENING TOBACCO-PLANTS.

No. 837,473.  Specification of Letters Patent.  Patented Dec. 4, 1906.

Application filed April 19, 1906. Serial No. 312,609.

*To all whom it may concern:*

Be it known that I, LUTHER GEO. IHRIG, a citizen of the United States, residing at Lenoxburg, in the county of Bracken and State of Kentucky, have invented new and useful Improvements in Implements for Deadening Tobacco-Plants, of which the following is a specification.

My invention pertains to implements for use in the treatment of plants; and it contemplates the provision of an implement through the medium of which tobacco-plants may be expeditiously and easily deadened—i. e., bruised adjacent to the bases of the stalks—and in that way caused to ripen quickly, to increase in weight, and to improve in color.

The invention will be fully understood from the following description and claims when the same are read in connection with the accompanying drawings, forming part of this specification, in which—

Figure 1 is a perspective view illustrating the lower portion of my novel implement as properly arranged relative to a tobacco-plant to be deadened. Fig. 2 is an enlarged inverted plan view of the said portion of the implement, and Fig. 3 is a transverse section taken in the plane indicated by the line 3 3 of Fig. 2.

Similar letters designate corresponding parts in all of the views of the drawings, referring to which—

A A are the plant-engaging members of the implement constituting the present and preferred embodiment of my invention. The said members A are reduced in thickness and lapped at an intermediate point, as best shown in Fig. 1, and are pivotally connected together through the medium of a pintle $a$, having a large beveled head at its lower end, as shown in Fig. 2. Each member A comprises a forward jaw B, the inner edge of which is blunt and rounded, as appears in Fig. 1, and a rear arm C, which is disposed at an obtuse angle to the jaw, this latter in order to enable the arms C to extend upwardly at an obtuse angle when the jaws B are placed flat on the ground or are held in a horizontal position slightly above the ground, as when engaging a tobacco-plant after the manner shown in Fig. 1.

D D are hand-levers which are preferably of a considerable length, so as to afford leverage. The said hand-levers D are connected at points adjacent to their forward ends to the rear portions of the arms C through the medium of pintles $b$ and are pivotally connected together at their forward ends and to the forward ends of links E through the medium of a pintle $c$. The links E are in turn pivotally connected through the medium of the before-mentioned pintles $b$ to the arms C and the hand-levers D.

It will be apparent from the foregoing that when the rear ends of the hand-levers D are moved outwardly the jaws B will be moved apart to permit them to be readily engaged with the stalk of a tobacco-plant and that when the rear ends of the hand-levers D are moved toward each other the jaws B will be moved together or closed, also that through the medium of the said hand-levers D and the arms C the operator is enabled to exert great leverage on the jaws B and in that way bruise the stalk of the plant between the jaws quickly and with the expenditure of but a minimum amount of effort. It will further be apparent that the links E assist in the connection of the hand-levers D to the arms C of the members A and in that way contribute materially to the strength and durability of the implement as a whole.

My novel implement will be found to be of practical advantage when a crop of tobacco is late and there is liability of its not ripening before it is destroyed by frost, for then rather than cut the tobacco while it is green an operator can deaden it, and thereby cause it to ripen quickly without loss of quality. Moreover, when the tobacco is deadened, as stated, its weight is increased and it is improved in color and at the same time is adapted to be handled without liability of breaking. I would also have it understood that the deadener can be used to great advantage in extremely wet seasons.

My novel implement is simple and inexpensive in construction and embodies no delicate parts such as are liable to get out of order after a short period of use.

As will be observed by reference to Fig. 2, the inner edges of the jaws B are slightly concave in the direction of their length, this in order to adapt the forward ends of the jaws to come together when the jaws are closed on a stalk to prevent too great crushing of the stalk and also to prevent the deadener from slipping away from the stalk when pressure is applied on the hand-levers.

Having described my invention, what I claim, and desire to secure by Letters Patent, is—

1. An implement having jaws the inner edges of which are convex in cross-section; the said edges being slightly concave in the direction of their length and having forward ends arranged to come together when the jaws are closed on a stalk.

2. An implement for deadening tobacco-plants, comprising members pivotally connected together at an intermediate point in their length and having forward jaws the inner edges of which are blunt and also having rear arms, and hand-levers pivotally connected together at their forward ends and pivotally connected at points in rear of their forward ends to the rear ends of the arms of the members.

3. An implement for deadening tobacco-plants, comprising members pivotally connected together at an intermediate point in their length and having forward jaws the inner edges of which are blunt and are concave in the direction of their length and also having rear arms, and hand-levers pivotally connected together at their forward ends and pivotally connected at points in rear of their forward ends to the rear ends of the arms of the members.

4. An implement for deadening tobacco-plants, comprising members pivotally connected together at an intermediate point in their length and having forward jaws the inner edges of which are blunt and also having rear arms, hand-levers pivotally connected together at their forward ends and pivotally connected at points in rear of their forward ends to the rear ends of the arms of the members, and links pivotally connected to the forward ends of the hand-levers and to the arms of the members at the points where said arms are connected to the hand-levers.

In testimony whereof I have hereunto set my hand in presence of two subscribing witnesses.

LUTHER GEO. IHRIG.

Witnesses:
D. C. McMath,
E. L. McMath.